United States Patent [19]

Journee et al.

[11] Patent Number: 5,623,742

[45] Date of Patent: Apr. 29, 1997

[54] MOTOR VEHICLE SCREEN WIPER HAVING MEANS FOR ORIENTATION OF THE DRIVE HEAD

[75] Inventors: Maurice Journee, Reilly; Philippe Favre, Quevilly, both of France

[73] Assignee: Paul Journee, S.A., Reilly, France

[21] Appl. No.: 414,123

[22] Filed: Mar. 20, 1995

[30] Foreign Application Priority Data

Mar. 23, 1994 [FR] France .................................... 94 03413

[51] Int. Cl.⁶ ........................................................ B60S 1/34
[52] U.S. Cl. .................................... 15/250.34; 15/250.31;
403/97; 403/83; 403/91; 403/263
[58] Field of Search .......................... 15/250.34, 250.31,
15/250.352, 250.351, 250.3; 435/97, 147,
206, 83, 101, 88, 91, 104, 263, 234, 235

[56] References Cited

U.S. PATENT DOCUMENTS

| 2,493,527 | 1/1950 | Carey ...................... 15/250.34 |
| 2,642,611 | 6/1953 | Anderson ................. 15/250.34 |
| 2,684,258 | 7/1954 | Krohm ..................... 15/250.34 |
| 2,738,535 | 3/1956 | Horton ..................... 15/250.34 |
| 3,056,990 | 10/1962 | Ryck ....................... 15/250.34 |

FOREIGN PATENT DOCUMENTS

| 604324 | 6/1994 | European Pat. Off. ............ 15/250.42 |
| 2679304 | 7/1991 | France . | |
| 2647510 | 4/1978 | Germany ........................... 15/250.34 |
| 4224861 | 2/1994 | Germany . | |
| 875387 | 8/1861 | United Kingdom . | |

Primary Examiner—Gary K. Graham
Attorney, Agent, or Firm—Morgan & Finnegan, L.L.P.

[57] ABSTRACT

A motor vehicle screen wiper comprises a screen wiper arm having a drive head fastened on an end portion of a motor shaft, which is part of a screen wiper drive unit. The motor shaft end portion comprises a conical portion which is received in a complementary through hole associated with the drive head, and which is extended by a threaded terminal shank on to which a fastening nut is screwed. The radial thrust face of the nut cooperates with a portion, in facing relationship with it, of the upper face of the drive head. The drive head comprises an orientation ring in which the conical through hole is formed, with one face of the orientation ring being formed with a set of ridges which cooperate with a complementary ridged engagement surface formed, in facing relationship with the ridged face of the orientation ring, on the body of the drive head. The body is formed with an oblong through hole through which the end portion of the motor shaft extends.

9 Claims, 2 Drawing Sheets

MOTOR VEHICLE SCREEN WIPER HAVING MEANS FOR ORIENTATION OF THE DRIVE HEAD

FIELD OF THE INVENTION

The present invention relates to a motor vehicle screen wiper. More particularly, the invention is directed to a screen wiper of the type comprising a screen wiper arm having a drive head which is fastened on to an end portion of a motor or drive shaft, which is itself part of a drive unit for the screen wiper.

BACKGROUND OF THE INVENTION

In the most common method currently in use for fastening the screen wiper arm on to the motor shaft, so that the latter can drive the wiper arm in rotation, the end portion of the motor shaft has a conical portion which is received in a complementary conical through hole associated therewith and formed in the drive head. This conical portion of the motor shaft is extended by a threaded terminal shank of the shaft, on to which a fastening nut is screwed. The radial thrust surface of the nut cooperates with a portion, in facing relationship with it, of the upper face of the drive head.

In one known arrangement, the axis of the conical through hole is perpendicular to the flat upper and lower faces of the drive head of the screen wiper arm, in such a way that, in the assembled condition, these two faces lie in planes which are at right angles to the axis of rotation of the motor shaft. This geometrical arrangement determines the general orientation of the screen wiper arm, of the screen wiper blade which is pivoted to the outer end of the wiper arm, and of the wiping strip which is carried by the wiper blade. This orientation is of course the orientation of these elements with respect to the structure of the vehicle, and therefore with respect to the surface which is to be swept, which may for example be the windshield of the vehicle.

DISCUSSION OF THE INVENTION

In some applications, while the various components of screen wipers are standardised to the greatest possible extent, it is desirable to have a facility for adjusting the orientation of the screen wiper arm, and therefore of the wiping strip. It may further be desired that this adjustment should be available in respect of several axes of orientation.

According to the invention, a motor vehicle screen wiper of the type comprising a screen wiper arm, the drive head of which is fixed on the end portion of a motor shaft which is part of a screen wiper drive unit, the screen wiper being further of the type in which the end portion of the motor shaft has a conical portion which is received in a complementary through hole associated with the drive head, the end portion of the motor shaft further including a shank whereby the motor shaft is extended beyond the said conical portion, a fastening nut being screwed on to the shank, with the radial thrust surface of the fastening nut cooperating with a portion, in facing relationship with it, of the upper face of the drive head, is characterised in that the drive head comprises an orientation ring in which the said conical through hole is formed, and which has a face formed with a set of ridges which cooperate with a complementary ridged engagement surface formed in facing relationship with it on the body of the drive head, the said body being formed with an oblong through hole, through which the end portion of the motor shaft extends.

According to a preferred feature of the invention, the said ridges are parallel, and are formed on a cylindrical surface in such a way as to enable the body of the drive head to be orientated with respect to the axis of the motor shaft, by pivoting movement of the body of the drive head with respect to the orientation ring and about an axis which is substantially at right angles to the direction in which the said ridges extend.

According to another preferred feature of the invention, the said ridges are parallel, and are formed on a cylindrical face in such a way as to enable the body of the drive head to be orientated with respect to the axis of the motor shaft, by pivoting movement of the body of the drive head with respect to the orientation ring about an axis which is substantially parallel to the direction in which the said ridges extend.

According to a further preferred feature of the invention, the ridges are parallel and are formed on a spherical surface in such a way as to enable the body of the drive head to be orientated with respect to the axis of the motor shaft, about an axis which is parallel to the direction in which the ridges extend, and about an axis which is at right angles to the direction in which the ridges extend. In that case, preferably, the ridged face of the orientation ring carries two sets of parallel ridges, the two said sets of ridges being at right angles to each other.

According to yet another preferred feature of the invention, the engagement surface is formed in the lower face of the body of the drive head.

In one preferred embodiment in which the said ridges are parallel and are formed on a cylindrical surface in such a way as to enable the body of the drive head to be orientated with respect to the axis of the motor shaft, by pivoting movement of the body of the drive head with respect to the orientation ring and about an axis which is substantially at right angles to the direction in which the said ridges extend, and in which the engagement surface is formed in the lower face of the body of the drive head, a second orientation ring is interposed between the fastening nut and the upper face of the body of the drive head, and has a face which is formed with a set of parallel ridges cooperating with a complementary ridged surface formed in the upper face of the body of the drive head, in such a way as to enable the body of the drive head to be orientated with respect to the axis of the motor shaft by pivoting movement of the body of the drive head about a second articulation or pivot axis.

In a preferred embodiment of such an arrangement, the parallel ridges of the two ridged surfaces of the body of the drive head extend at right angles to each other.

According to a still further preferred feature of the invention, a stop member is interposed between the radial thrust face of the fastening nut and the upper face of the body of the drive head, and the lower face of the stop member is a curved face having a curvature which corresponds to that of the ridged face of the orientation ring.

The lower face of the stop member is preferably spherical.

Further features and advantages of the invention will appear more clearly on a reading of the description of some preferred embodiments of the invention which follows, and which is given by way of example only and with reference to the accompanying drawings.

DESCRIPTION OF PREFERRED EMBODIMENTS OF THE INVENTION

Figure 1:
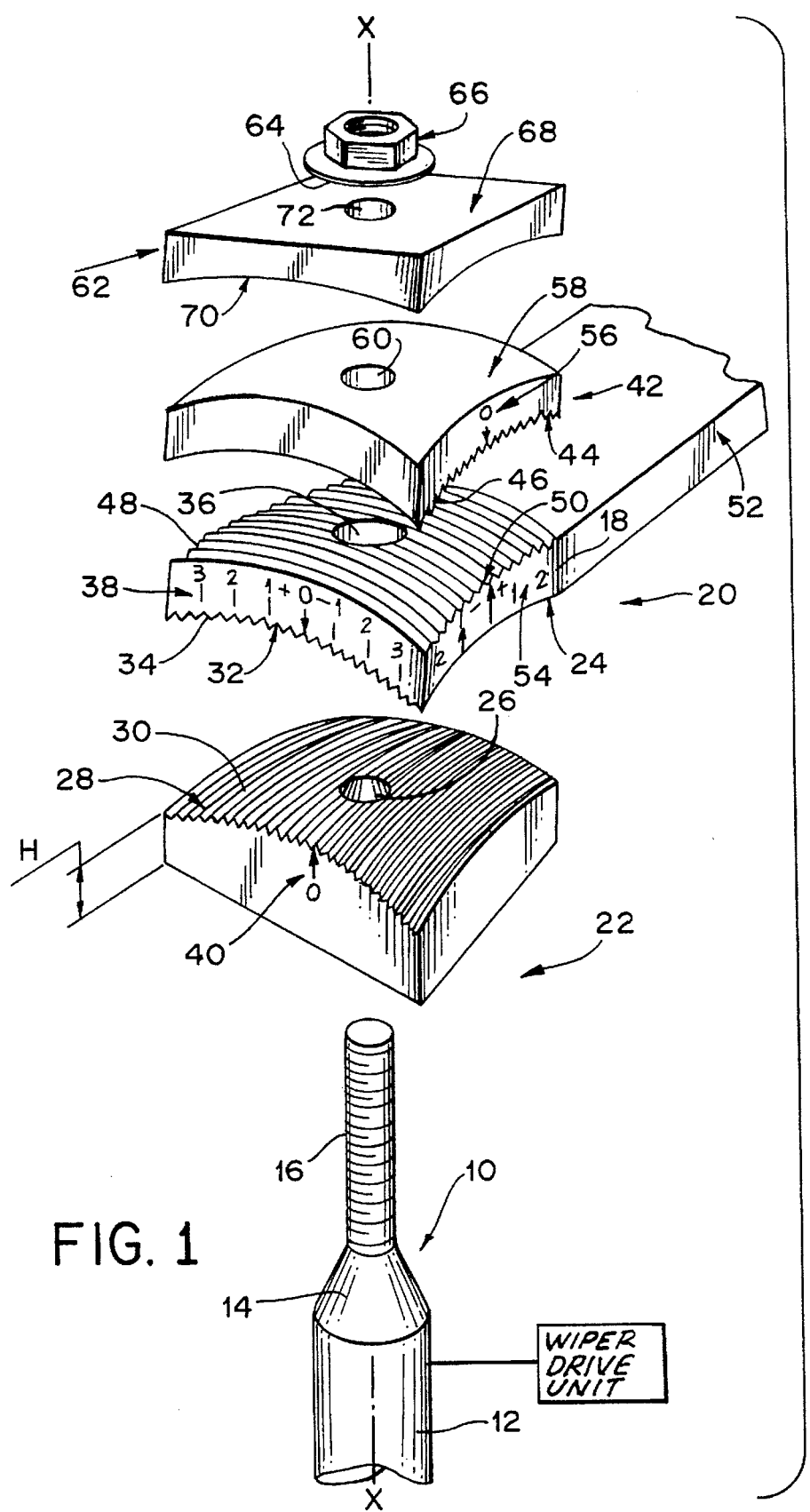
FIG. 1 is a diagrammatic, exploded perspective view showing a motor vehicle screen wiper made in accordance with the present invention.

FIG. 1 shows a motor shaft 10 having an axis X—X of rotation and a free end portion 12. This end portion 12 comprises, in succession, a conical, knurled portion 14 for driving the wiper itself in rotation, and a threaded terminal shank 16.

FIG. 1 also shows the body 18 of a drive head 20, which is arranged to receive a screen wiper arm (not shown) in articulated relationship. The wiper arm is arranged to pivot with respect to the drive head 20, about a pivot axis which is substantially at right angles to the axis of rotation X—X of the motor shaft 10.

A first orientation ring, or drive ring, 22 is interposed between the end portion 12 of the motor shaft 10 and the lower face 24 of the body 18 of the drive head 20. This first orientation ring 22 has a conical, knurled central through hole 26 which is arranged to cooperate with the conical knurled portion 14 of the drive shaft 10, so that the ring 22 is thereby driven in rotation by the motor shaft 10.

The upper face 28 of the first orientation ring 22 is a spherical face, the centre of which lies on the axis of the conical through hole 26. A set of parallel ridges 30 is formed on the face 28 of the ring 22. The lower face 24 of the body 18 of the drive head 20 has a complementary ridged engagement face 32, which is again a portion of a spherical surface having a series of parallel ridges 34.

The body 18 of the drive head 20 has an oblong central through hole 36, through which the threaded shank 16 of the motor shaft 10 passes freely, with a clearance around it. From the foregoing it can readily be understood that it is possible to position the body 18 of the drive head 20 with respect to the first orientation ring 22, and therefore with respect to the axis X—X of the motor shaft, in any one of a number of different positions, by stepwise pivoting of the body 18 about a geometric axis which is parallel to the ridges 30 and 34, and which is substantially at right angles to the axis X—X of the motor shaft. The oblong shape of the through hole 36 in the body 18 enables this relative displacement of the body 18 to be obtained with respect to the first drive ring 22 and with respect to the end portion 12 of the motor shaft.

The relative position of these two components can be indicated visually by means of graduations and marks 38 and 40, which enable the value of the angle of inclination of the drive head 20 with respect to the axis X—X to be determined. This angle is referred to as the sweep angle of the screen wiper.

In the example shown, the screen wiper also includes a second orientation ring 42, which is arranged above the upper face 52 of the body 18 of the drive head 20. The lower face 44 of this second orientation ring 42 is another spherical surface, which is formed with a set of parallel ridges 46 which are such as to cooperate with a set of complementary ridges 48 formed in a spherical, ridged surface portion 50 on the upper face 52 of the body 18 of the drive head 20.

Cooperation of the ridges 46 with the ridges 48 enables the orientation of the body 18 of the drive head 20 to be varied with respect to the axis X—X, about a second orientation axis parallel to the common direction of the ridges 46 and 48, in such a way as to enable the azimuth angle of the screen wiper to be adjusted.

This second orientation axis is perpendicular to the first orientation axis, due to the fact that the ribs 48 extend in a direction at right angles to that in which the ribs 34 extend.

Graduated marks 54 and 56 enable the azimuth angle of the drive head to be adjusted accurately.

The arrangement described above also enables the altitude of the body 18 of the drive head 20 to be varied with respect to the fixed structure of the vehicle on which the motor shaft 10 rotates, this being achieved by selecting the depth H of the first orientation ring 22.

The upper face 58 of the second orientation ring 42 is a portion of a spherical surface. The ring 42 has a central through hole 60, through which the threaded shank 16 of the motor shaft 10 extends, again with a radial clearance.

A stop member 62 is interposed between the lower face, or radial thrust face, 64 of a fastening nut 66 and the second orientation ring 42. The nut 66 is screwed on to the threaded shank 16 of the motor shaft 10. The upper face 68 of the stop member 62 is flat, while its lower face 70 is a portion of a spherical surface complementary with the upper spherical surface 58 of the second orientation ring 42. Finally, the stop member 62 has a central through hole 72, and the threaded shank 16 of the motor shaft 10 passes through this hole, but this time without a radial clearance.

In use, after the various angles of orientation of the drive head 20 have been adjusted with respect to the axis X—X, the operator need only tighten the nut 66, whereupon the various components are held positively in their predetermined respective positions.

The drive head 20 is driven in rotation through the knurls or ridges on the conical portion 14 of the motor shaft end portion 12: these ridges cooperate with the knurled conical through hole 26 of the first orientation ring 22. The drive is transmitted through the two sets of ridges 30, 34 and 46, 48, which are held in mutual engagement by the fastening nut 66.

Figure 2:
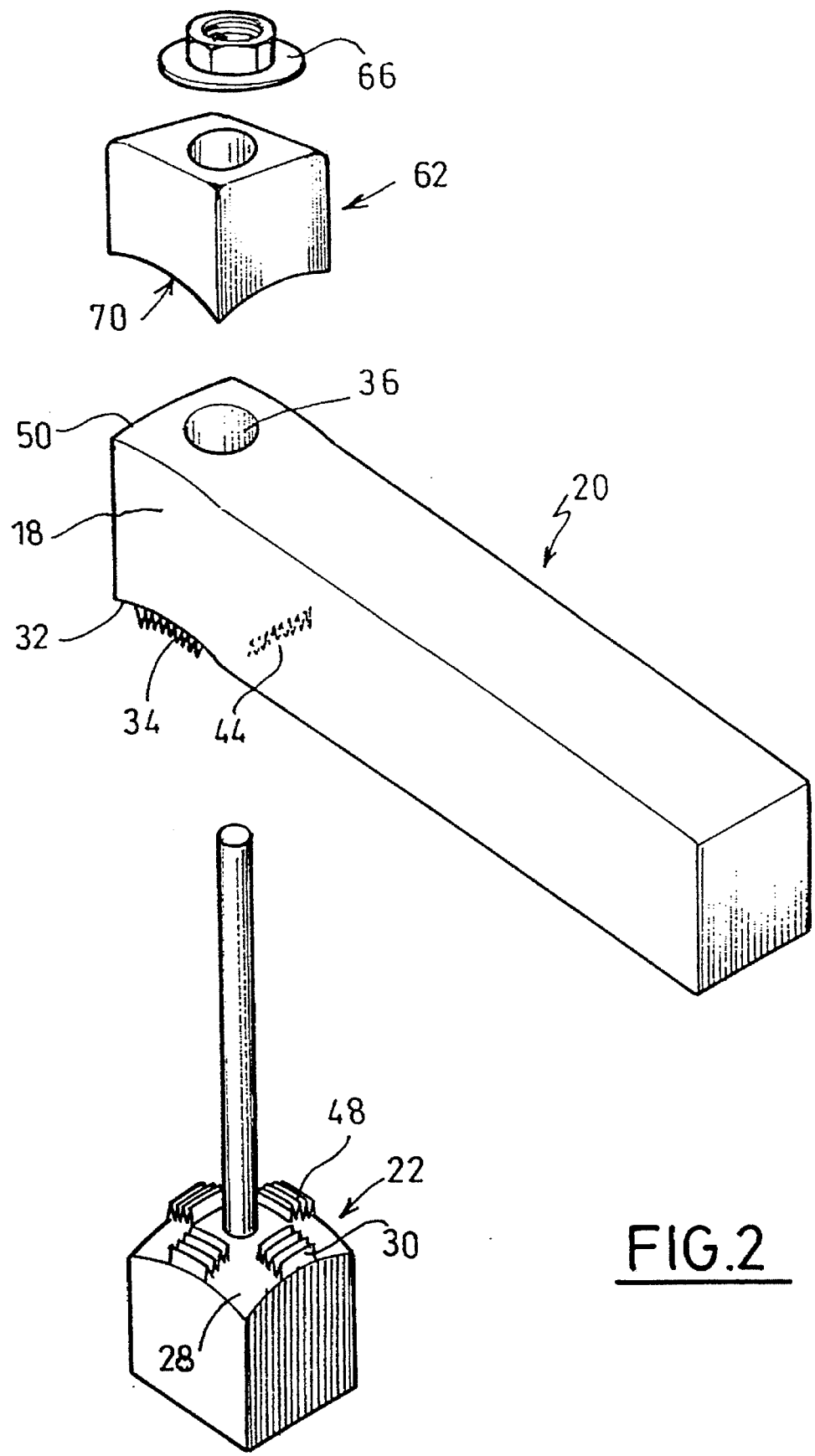
FIG. 2 is a view similar to that of FIG. 1, but shows a second embodiment of screen wiper in accordance with the invention.

Reference is now made to FIG. 2. In this modified embodiment, there is only a single orientation ring 22. The upper face 28 of the latter is spherical and has two sets of parallel ridges 30 and 48, arranged at right angles to each other and cooperating respectively with two sets of parallel ridges 34 and 44, again at right angles to each other, which are formed in a lower spherical surface portion 32 of the body 18 of the drive head 20.

The upper surface portion 50 of the body 18 of the drive head 20 is a portion of a smooth spherical surface which is complementary to the spherical lower surface 70 of the stop member, or ring, 62.

As in the previous embodiment shown in FIG. 1, the design seen in FIG. 2 enables the sweep angle, the azimuth angle, and the depth of the drive head to be adjusted with respect to the structure of the vehicle.

It is possible to conceive simplified versions of the arrangement according to the invention, especially when it is desired to carry out only a single angular adjustment of the position of the drive head 20 with respect to the axis X—X of the motor shaft 10. It is then enough simply to provide a single set of parallel ridges arranged on a cylindrical surface of a single orientation ring.

What is claimed is:

1. A motor vehicle screen wiper assembly comprising a screen wiper drive unit having a rotatable motor shaft defining an end portion and an axis of rotation thereof, a drive head of a screen wiper arm, and fastening means securing the drive head on the said end portion of the motor shaft, the said end portion comprising a conical portion and a terminal threaded shank projecting from the conical portion, the drive head having a conical through hole complementary to the conical portion of the motor shaft for cooperation therewith, the fastening means including the said conical portion and shank of the motor shaft and a nut having a radial thrust face, the nut being screwed on to the threaded shank of the motor shaft, the drive head having an upper face with which the said thrust face of the nut cooperates, wherein the drive head includes an orientation ring in which the said conical hole is formed and which has a first arcuate face defining a first set of elongated ridges thereon, the drive head further including a drive head body having a second arcuate face formed with a second set of elongated ridges cooperating with the first set of ridges, the drive head body having an oblong through hole, with the said motor shaft end portion extending through both said conical and oblong holes, wherein said oblong hole allows lateral movement of the drive head body with respect to the axis of rotation and the orientation ring.

2. A screen wiper assembly according to claim 1, wherein the said first and second ridges are parallel, the said first and second faces being arcuate in a first plane, whereby the body of the drive head can be oriented with respect to the axis of rotation by pivoting movement of the drive head body with respect to the orientation ring, about an axis substantially at right angles to the direction in which the ridges extend.

3. A screen wiper assembly according to claim 2 in which the said second face is a lower face of the drive head body, the drive head including a second orientation ring, the drive head body having an upper face and said second orientation ring being interposed between the fastening nut and the upper face of the drive head body, said upper face of the drive head body being formed with a third set of ridges, the second orientation ring having a third face formed with a fourth set of ridges cooperating with said third ridges, whereby the drive head body can be oriented with respect to the axis of rotation by pivoting movement of the drive head body about a second pivot axis.

4. A screen wiper assembly according to claim 3, wherein the said parallel second ridges of the said second surface are perpendicular to the said fourth ridges of the said third face.

5. A screen wiper assembly according to claim 2 in which the said second face is a lower face of the drive head body, the drive head including a second orientation ring, the drive head body having an upper face and the second orientation ring being interposed between the fastening nut and the upper face of the drive head body, said upper face of the drive head body being formed with a third set of ridges, the second orientation ring having a third face formed with a fourth set of ridges cooperating with said third ridges whereby the drive head body can be oriented with respect to the axis of rotation by pivoting movement of the drive head body about a second pivot axis, and a south face, the screen wiper assembly further including a stop member interposed between the said thrust face of the fastening nut and the upper face of the drive head body, the stop member having a curved lower face defining a curvature corresponding to that of the south face of the adjacent orientation ring, and the lower face of the stop member being arcuate in first and second perpendicular planes.

6. A screen wiper assembly according to claim 1, wherein the said first and second ridges are parallel, the said first and second faces being arcuate in a first plane, whereby the drive head body can be oriented with respect to the axis of rotation by pivoting movement of the drive head body with respect to the orientation ring about an axis substantially parallel to the direction in which the ridges extend.

7. A screen wiper assembly according to claim 1, wherein the faces on which the ridges are formed are arcuate in first and second perpendicular planes, whereby the drive head body can be oriented with respect to the axis of rotation, about an axis parallel to the direction in which the ridges extend and about an axis at right angles to the said direction.

8. A screen wiper assembly according to claim 1, wherein the said second face is a lower face of the drive head body.

9. A screen wiper assembly according to claim 1, wherein the upper face of the drive head is curved, and further including a stop member interposed between said thrust face of the fastening nut and the upper face of the drive head, the stop member having a curved lower face defining a curvature corresponding to that of the upper face of the drive head.

* * * * *